(12) United States Patent
Benedetto

(10) Patent No.: US 7,505,666 B2
(45) Date of Patent: Mar. 17, 2009

(54) STRAIN RELIEF DEVICE FOR A GLASS FIBER CABLE

(75) Inventor: Adrian Benedetto, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 11/897,363

(22) Filed: Aug. 30, 2007

(65) Prior Publication Data

US 2008/0080831 A1 Apr. 3, 2008

(30) Foreign Application Priority Data

Sep. 29, 2006 (DE) .................. 10 2006 046 181

(51) Int. Cl.
*G02B 6/36* (2006.01)

(52) U.S. Cl. .................. 385/136; 385/86; 385/87

(58) Field of Classification Search ............ None
See application file for complete search history.

(56) References Cited

U.S. PATENT DOCUMENTS

| 4,247,163 | A | * | 1/1981 | Lumpp et al. ............... 385/136 |
| 4,447,120 | A | | 5/1984 | Borsuk |
| 4,493,529 | A | * | 1/1985 | Doty .......................... 385/69 |
| 4,746,187 | A | * | 5/1988 | Flores ......................... 385/87 |
| 5,444,810 | A | | 8/1995 | Szegda |
| 5,644,673 | A | * | 7/1997 | Patterson ................... 385/138 |
| 6,738,555 | B1 | | 5/2004 | Cooke et al. |
| 6,909,828 | B2 | | 6/2005 | Zimmel et al. |
| 7,035,510 | B2 | | 4/2006 | Zimmel et al. |

| 2005/0100303 | A1 | * | 5/2005 | Cox ........................... 385/136 |
| 2005/0276551 | A1 | | 12/2005 | Brown et al. |

FOREIGN PATENT DOCUMENTS

| EP | 0131283 A2 | * | 7/1984 |
| EP | 0389435 A1 | * | 3/1990 |
| EP | 0 518 597 A2 | | 12/1992 |
| JP | 61-114213 A | * | 5/1986 |
| JP | 10-332953 | | 12/1998 |
| JP | 2000-199829 A | * | 7/2000 |
| JP | 2004-69747 | | 3/2004 |

* cited by examiner

*Primary Examiner*—Sung H Pak
*Assistant Examiner*—Mike Stahl
(74) *Attorney, Agent, or Firm*—Merchant & Gould P.C.

(57) ABSTRACT

The invention relates to a strain relief device (40) for glass fiber cables (50) having a cable jacket (56) and at least one glass fiber (57) and fibers (58) arranged between the at least one glass fiber (57) and the cable jacket (56), in which, at one end of the glass fiber cable (54), the cable jacket (56) is cut back, in order to provide strain relief at a distance from a termination or connection of the at least one glass fiber (57) from which the cable jacket (56) has been removed, said strain relief means comprising a main body (1) with a clamping body (3) and a securing body (21) with a further clamping body (22), wherein the main body (1) and the securing body (21) can be connected to one another so that at least some of the fibers (58) which are exposed when the cable jacket (56) is cut back from the at least one glass fiber (57) are secured adjacent to their exit from the cable jacket (56) between the clamping body (3) and the further clamping body (22) by a clamping means. In addition, the invention relates to a method for attaching such a strain relief device.

18 Claims, 4 Drawing Sheets

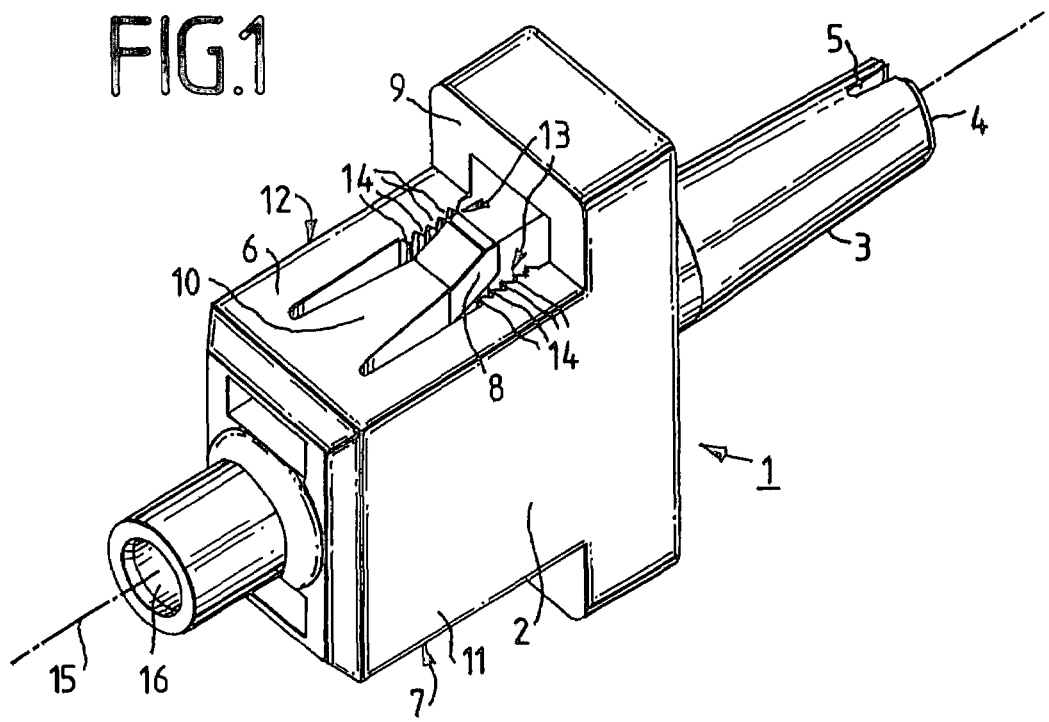
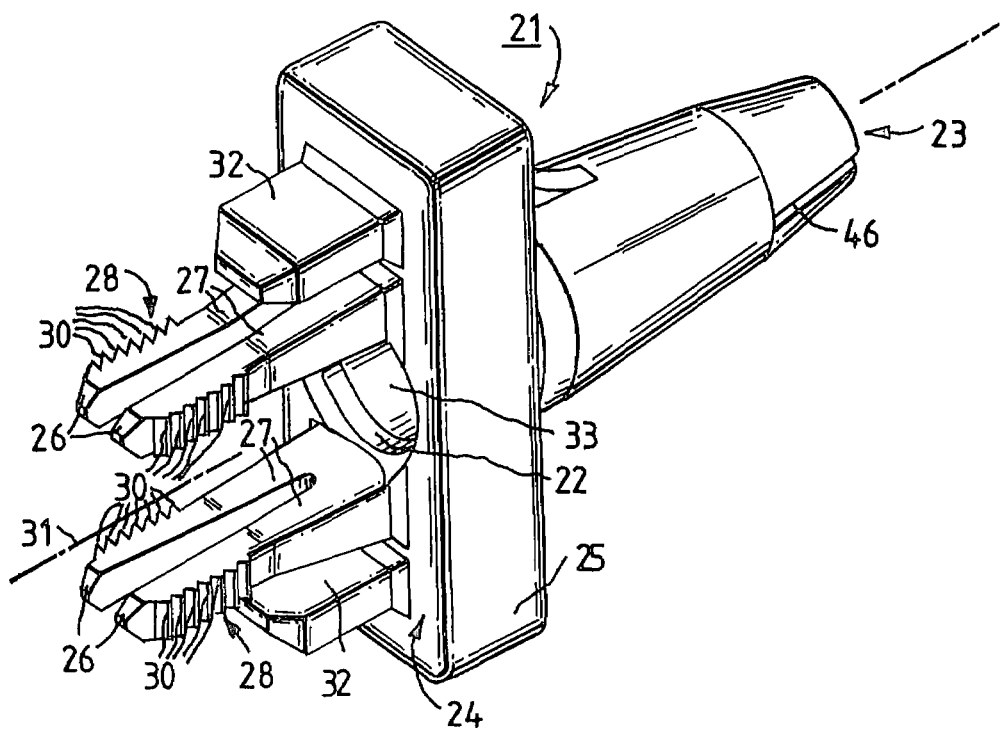

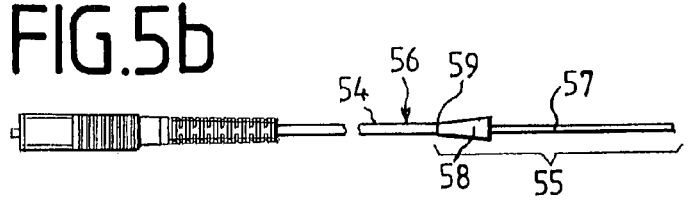
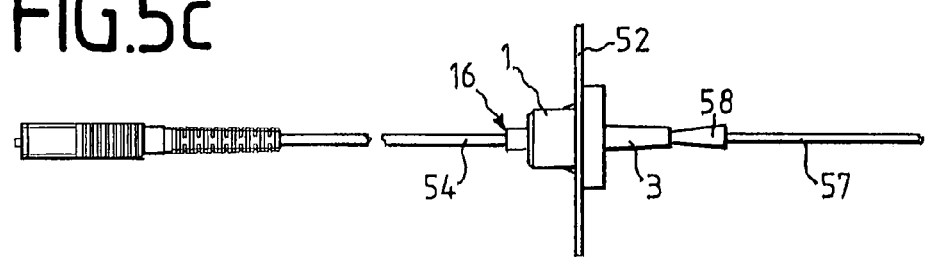
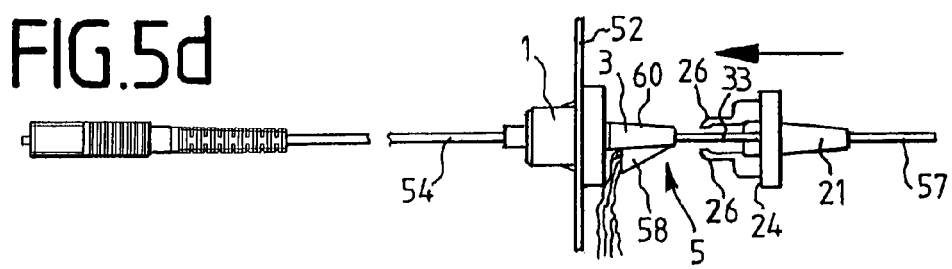
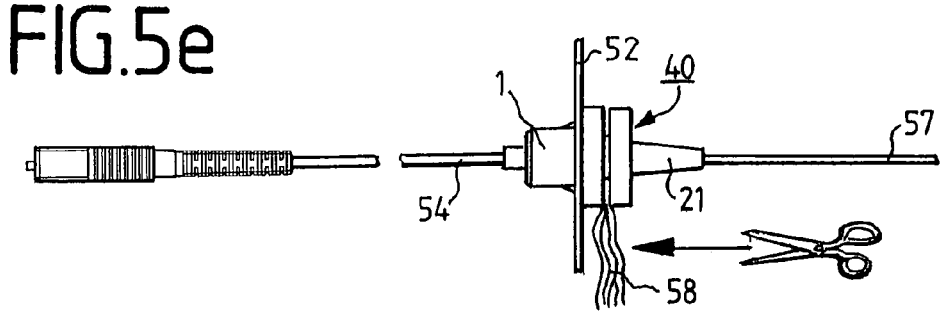
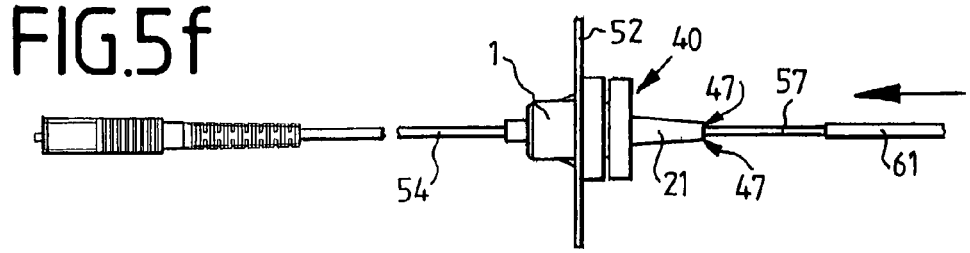
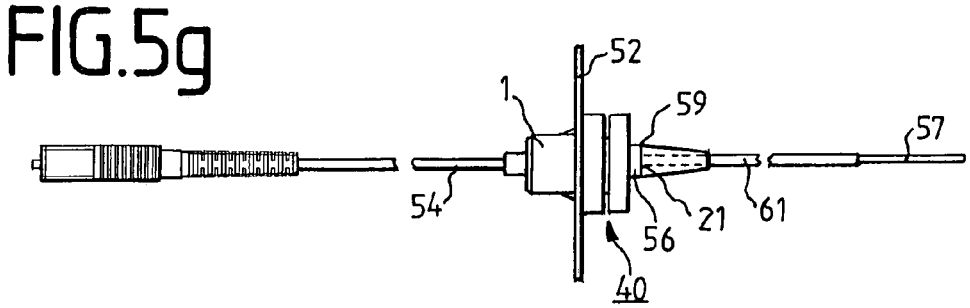

STRAIN RELIEF DEVICE FOR A GLASS FIBER CABLE

BACKGROUND OF THE INVENTION

The invention relates to a strain relief device for a glass fiber cable which is arranged at a distance from or separately from a termination or connection of a glass fiber which is included in the glass fiber cable. The invention also relates to a method for attaching a strain relief device.

Glass fiber cables are composed of one or more glass fibers which are surrounded by a cable jacket for protection against damage. A fiber material, which is composed, for example, of Kevlar fibers or Aramide yarn is arranged between the glass fibers and the cable jacket. In order to connect the individual glass fibers (optical waveguides) of the glass fiber cable to other glass fibers, the ends are either spliced or provided with a plug and/or a coupling. In the prior art, plugs and couplings are known which comprise a strain relief means so that tensile forces acting on the glass fiber cable do not impede or destroy the connection of the individual glass fibers to those of another glass fiber cable. Splicing glass fibers is generally carried out in distributor cabinets or sleeves. Strain relief of the glass fiber cables only takes place in a rudimentary form in the prior art by attaching the glass fiber cable to a component of the distributor cable or sleeve using, for example, a cable tie. A strain relief device which is designed in this way is suitable only to a certain degree for absorbing tensile forces acting on the glass fiber cable. The reason for this is that it is not desirable to squeeze the glass fiber cable, for example by means of the cable tie, since this increases the attenuation loss of the individual glass fibers which are contained in the glass fiber cable and since the provision of a strain relief means which squeezes a glass fiber cable always entails the risk of damage to individual glass fibers of the glass fiber cable. However, in distributor devices, for example distributor cabinets, it is desirable to remove the jacket from the ends of the individual glass fibers over a relatively large distance of, for example, several meters. Cutting back the jacket is a great advantage because as a result the space required to store the glass fiber can be significantly reduced since the jacket takes up a large volume in relation to the glass fiber or fibers. In addition, glass fibers which do not have a jacket are easier to guide in distributor devices. Nevertheless, it is desirable for tensile forces acting on the glass fiber cable to be absorbed at a strain relief device so that the individual glass fibers remain free of force in the distributor device.

SUMMARY OF THE INVENTION

The invention is thus based on the technical problem of providing a strain relief device and a method for attaching a strain relief device to a glass fiber cable, with which strain relief is made possible at a distance from a termination and/or connection of a glass fiber.

In particular, a strain relief device is provided for a glass fiber cable having a cable jacket and at least one glass fiber and fibers, made, for example, of Kevlar or Aramide yarn, arranged between the at least one glass fiber and the cable jacket, the cable jacket being cut back at one end of the glass fiber cable and the strain relief device for providing strain relief being provided at a distance from a termination or connection of the at least one glass fiber from which the cable jacket has been removed. The strain relief device comprises a main body with a clamping body and a securing body with a further clamping body. The main body and the securing body can be connected to one another so that at least some of the fibers which are exposed when the cable jacket is cut back from the at least one glass fiber are secured adjacent to their exit from the cable jacket between the clamping body and the further clamping body by a clamping means. A method according to the invention for attaching the strain relief device thus comprises the steps of arranging at least some of the fibers which are exposed when the cable jacket is cut back from the at least one glass fiber adjacent to their exit from the cable jacket between the clamping body of a main body of the strain relief device and a further clamping body of a securing body of the strain relief device and connecting the main body and the securing body to one another so that at least some of the exposed fibers are secured between the clamping body and the further clamping body by a clamping means. The clamping of at least some of the fibers which are arranged between the individual glass fibers and the cable jacket provides the advantage that large tensile forces acting on the cable can be absorbed by the strain relief device via the fibers. In commercially available glass fiber cables which comprise a glass fiber, strain relief devices according to the invention which can absorb tensile forces of 100 Newtons and more can easily be manufactured. The strain relief device is advantageously embodied in two pieces and can thus easily be attached to the glass fiber cable. The strain relief device proposed also does not adversely affect the optical properties of the individual glass fibers in any way. This provides a large advantage over the previously used strain relief device. In addition, there is no longer any risk of damage to the glass fiber when the strain relief device is attached to the glass fiber cable.

In one particularly preferred embodiment of the strain relief device there is provision for the clamping body and the further clamping body each to have a through-opening which, when the main body is connected to the securing body, forms a through-opening through the strain relief device through which the glass fiber cable and/or the at least one glass fiber extend. This ensures that the glass fiber and/or the glass fiber cable is guided through the strain relief device in the area at which the strain relief takes place. In particular, this avoids damage to the glass fiber in the area at which the exposed end of the glass fiber begins. Force which is transmitted to the strain relief device by the tensile forces therefore cannot cause the glass fiber cable and possibly the exposed glass fiber to move relative to the strain relief device in such a way that damage can occur.

Particularly good clamping of the fibers occurs in one preferred embodiment of the invention in which the clamping body and the further clamping body have surfaces which are complementary to one another and between which the fibers are clamped.

Strain relief devices in which the clamping body and the further clamping body are of conical design have proven particularly effective as a strain relief device which has particularly suitable surface shapes for the clamping body and the further clamping body. Two conical surfaces which are complementary to one another have the advantage that when they approach one another the two surfaces are centered with respect to a common axis of their cones. If, for example, the through-opening through the main body and the securing body is embodied in each case so as to be concentric to the axis of the cones, it is possible to ensure reliably that when the main body is connected to the securing body the through-openings of the main body and of the securing body are centered with respect to one another in an optimum way. The glass fiber cable or the glass fiber can thus be guided through the resulting common through-opening without risk and damage to the glass fiber during the connection of the main body to the securing body is thus prevented.

In one preferred embodiment of the invention, there is thus provision for the clamping body to comprise a mandrel-like outer surface which tapers conically to a tip and for the further clamping body to comprise a funnel-shaped inner surface which tapers conically inwards, between which surfaces the part of the exposed fibers is clamped in the connected state.

A particularly satisfactorily acting strain relief means is obtained if the material to be clamped has a large material thickness. Because the fibers which are arranged between the glass fiber and the cable jacket are essentially distributed uniformly around the circumference of the cable, it is advantageous to bundle them to form a fiber bundle. In one preferred embodiment of the invention this can be done by bundling at least some of the exposed fibers and possibly pre-securing them by guiding them in a bundled fashion into a notch and possibly clamping them therein. This means that all the fibers which are distributed around the circumference of the glass fiber are combined to form a bundle and are guided in a notch. One preferred embodiment therefore comprises at least one notch for guiding and/or pre-securing the fibers in the bundled state.

One particularly preferred embodiment provides for the notch to be arranged on the tip of the clamping body which is embodied as a mandrel.

In order to be able to pass on the forces acting on the strain relief device, the strain relief device is arranged in a mounting plate. According to the invention, in this embodiment of the method there is provision that before the connection to the securing body the main body is latched in a cutout in a mounting plate by means of a latching device. A corresponding embodiment of a strain relief device is thus advantageously designed in such a way that the main body has a latching device for latching the main body in a cutout in a mounting plate.

In order to be able to connect the main body and the securing body to one another, one preferred embodiment of the invention provides, in addition to the latching device, that the main body has a latching element and the securing body has further latching elements which permit multistage latching of the main body to the securing body, a distance between the clamping body and the further clamping body being different in the different stages. A multistage latching provides the decisive advantage that glass fiber cables which comprise a different number of fibers, fibers of a different strength and further different physical properties, can all be used with the same pressure relief device. In all cases, sufficient clamping of the fibers can be achieved. If a large number of fibers with a large diameter are present in the glass fiber cable, sufficient clamping of the fibers can be achieved as early as in the first stage of the multistage latching. If, by contrast, only a few and/or thin fibers are used in the glass fiber cable, it may be necessary to use a plurality of latching stages of the multistage latching. The latching elements are advantageously embodied in such a way that in the last latching stage the clamping surfaces of the clamping body and of the further clamping body come into contact with one another. The latching elements and further latching elements are advantageously embodied in such a way that the main body can be connected to the securing body by means of a linear movement. This reliably prevents the glass fiber or the glass fiber cable becoming twisted when the strain relief device is attached.

One preferred embodiment of the invention provides for the main body to comprise, as a latching element, at least one latching surface which is formed on the inside of a housing wall of the main body and preferably has a plurality of teeth, and for the securing body to comprise, as further latching elements, at least one further latching surface which is attached on an elastic element, is embodied so as to be complementary to the latching surface and preferably has a plurality of teeth, the elastic element penetrating the main body during the multistage latching process, and said elastic element causing the teeth of the latching surface and of the further latching surface to engage with one another. Either the latching surface or the further latching surface has to have a plurality of teeth or latching projections so that multistage latching is possible. Preferably, both the latching surface on the main body and the further latching surface on the securing body each has a plurality of teeth or latching projections. The teeth are preferably embodied here in such a way that in the connected state the teeth surfaces which engage one in the other and which prevent the main body from becoming disconnected from the securing body in the latched state are oriented perpendicularly to the direction of movement in which the main body and the securing body are connected to one another or in which they could be separated from one another. Embodiments in which the tooth surfaces which are embodied so as to be complementary to one another form an angle with respect to the direction of movement which differs from 90° have the effect that, in order to form the latched connection, a shorter distance has to be brought about between the main body and the securing body than occurs between the main body and the securing body in the latched state, i.e. in the connected state, of the main body. This is generally not desired. Nevertheless, in individual embodiments latching elements with latching surfaces can be used which have such latching surfaces with such tooth surfaces. Latching elements and further latching elements with latching surfaces which comprise teeth with tooth surfaces which have an angle which differs from 90° can withstand relatively large forces until an inevitable release of the latching elements from the further latching elements and thus opening of the connection between the main body and the securing body occurs. The latching elements and the further latching elements can also be embodied in a converse way, i.e. is the latching surface of the main body could be arranged on an elastic element. Likewise, embodiments in which the latching surface and the further latching surface are mounted elastically are equivalent. Likewise, embodiments are possible in which at least one latching surface of the main body penetrates the securing body during the connection process and interacts with a further latching surface arranged in the interior of a securing body housing.

In order to absorb rotational and shearing loads which occur between the main body and the securing body and to prevent the connection between the main body and the securing body from becoming released, and in addition to bring about centering with respect to a rotation of the securing body in relation to the main body during the connection process, in one preferred embodiment of the strain relief device guide elements are provided which prevent the main body from rotating with respect to the securing body during the latching process and in the latched state.

Since a glass fiber from which the cable jacket has been removed can very easily be damaged, it is customary to draw a fine protective hose over it. In order to attach said protective hose to the strain relief device and to protect the glass fiber particularly in the region where the exposed glass fiber emerges from the strain relief device, in one preferred embodiment of the invention there is provision for the through-opening of the securing body to have a preferably oval opening with two clamping edges which lie opposite one another and which can spring apart from one another in order to accommodate and clamp a protective hose which has been pushed over the at least one glass fiber from which the cable jacket has been removed. One embodiment of the method according to the invention thus includes a method step: fitting of a protective hose over the exposed end of the at least one glass fiber and insertion of the protective hose into a preferably oval exit opening in the through-opening in the securing body, preferably until the protective hose abuts against the cable jacket, in order to accommodate and clamp the protective hose between two clamping edges which lie opposite one another and which spring outwards when the protective hose is inserted. In order to permit the clamping edges of the exit opening of the through-hole of the securing body to spring apart from one another, a slit is preferably provided which forms a notch in the edge of the exit opening on two sides which lie opposite one another.

The features of the method according to the invention have the same advantages as the corresponding features of the strain relief device.

BRIEF DESCRIPTION OF THE DRAWINGS

The invention will be explained in more detail below with reference to a preferred embodiment. In the drawings:

FIG. 1 is a perspective view of a main body of a strain relief device;

FIG. 2 is a perspective view of a securing body of a strain relief device;

FIGS. 5a-5g are graphic illustrations of a method for attaching a strain relief device to a glass fiber cable.

DETAILED DESCRIPTION OF THE PREFERRED EMBODIMENT(S)

Figure 3:
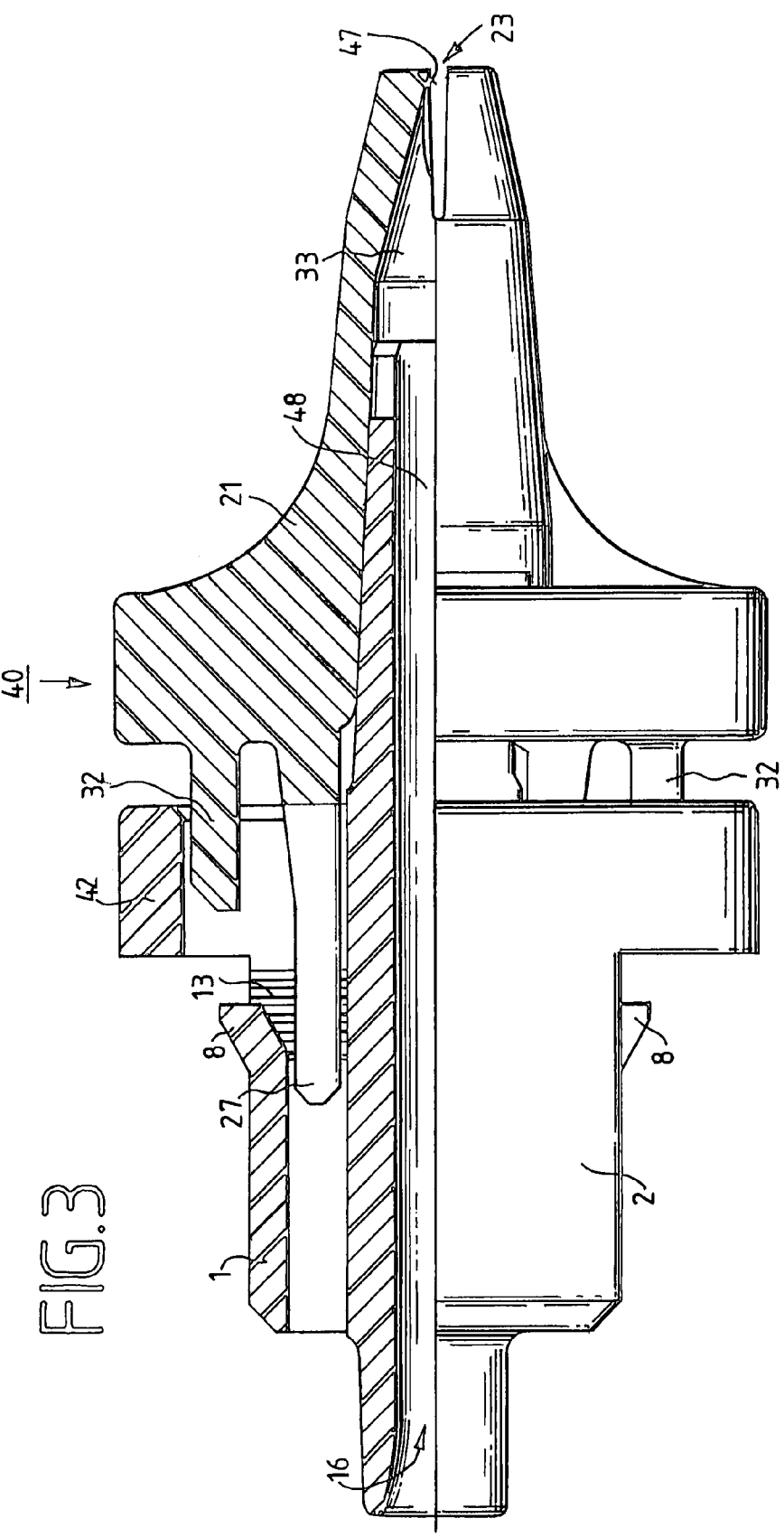
FIG. 3 is a partial sectional view of the main body, latched to the securing body, of a strain relief device.

FIG. 1 is a perspective view of a main body 1 of a strain relief device. The main body 1 comprises a housing 2 and a clamping body 3 which is embodied in the manner of a mandrel. An outer surface of the clamping body 3 tapers conically to a tip 4 of the clamping body 3. At the tip 4, the clamping body 3 is slit and has two notches 5, only one of which can be seen in FIG. 1. In each case a latching projection 8 is arranged at a distance from a base side surface 9, spring mounted on a web 10 on an upper side 6 and on a lower side 7 of the housing 2. In order to latch the main body 1 in a mounting plate, the main body 1 can be inserted in a cutout. In this context, the latching projections 8 engage in a sprung fashion in the interior of the housing 2. A mounting plate is thus clamped between the latching projections 8 and the base side surface 9.

Latching elements which are each formed as latching surfaces 13 in the interior of the housing 2, adjacent to the upper side 6 and the lower side 7, are arranged on a front side 11 and a rear side 12. These latching surfaces 13 comprise a plurality of teeth 14. The teeth 14 are each embodied in such a way that they have a tooth surface which has a 90° angle with respect to an axis 15 of symmetry of the conical outer surface of the clamping body 3. A through-opening 16 extends through the main body 1 and runs centrally through the clamping body 3. This through-opening 16 is provided for accommodating a glass fiber cable (not illustrated).

A securing body 21 which is of complementary design to the main body 1 according to FIG. 1 and, in the connected state, forms together with it a strain relief means is illustrated in FIG. 2. The securing body 21 comprises a further clamping body 22 which is embodied in a manner of a funnel and has an inner surface which tapers conically to an exit opening 23. The securing body 21 is designed in such a way that it can be connected to the main body 1 according to FIG. 1 in such a way that the clamping body 3 penetrates the further clamping body 22 when the securing body 21 is connected to the main body 1.

Further latching elements 26 which are embodied in pairs project from a side 24 of a securing body base 25 facing the main body 2. The further latching elements 26 are embodied as legs 27 which each have further latching surfaces 28 on sides, facing away from one another, of the further latching elements 26 which are arranged in pairs. The further latching surfaces 28 comprise a plurality of teeth 30 which each comprise a tooth surface which is oriented perpendicularly to an axis 31 of symmetry of the conical inner surface of the further clamping body 22. Two guide elements 32 also project from the side 24, facing the main body 1 in the connected state, of the securing body base 25, said guide elements 32 bringing about, on the one hand, centering of the securing body 21 with respect to the main body 1 during the connection process with respect to rotation of the securing body 21 in relation to the main body 1, and on the other hand, absorbing rotational and shearing forces in the connected state. A further through-opening 33 which comprises the exit opening 23 also extends through the securing body 21. The further through-opening 33 is provided for accommodating a glass fiber from which its cable jacket has been removed.

FIG. 3 is a partially sectional drawing of a strain relief device 40 in the connected state. That is to say the main body 1 according to FIG. 1 is connected to the securing body 21 according to FIG. 2 without clamping some of the fibers which are arranged between a glass fiber and a cable jacket of a glass fiber cable. It is apparent that the guide elements 32 of the securing body 21 penetrate a main body base 42, as do the legs 27. It can also be clearly seen that the legs 27 prevent the latching projections 8 from moving out into the interior of the housing 2 of the main body 1 in the latched state and thus blocking latching with a mounting plate which would be produced during normal use of the strain relief device 40 before the connection of the main body 1 to the securing body 21. The through-opening 16 and the further through-opening 33 of the securing body 21 form a common through-opening 48 in the connected state.

Figure 4:
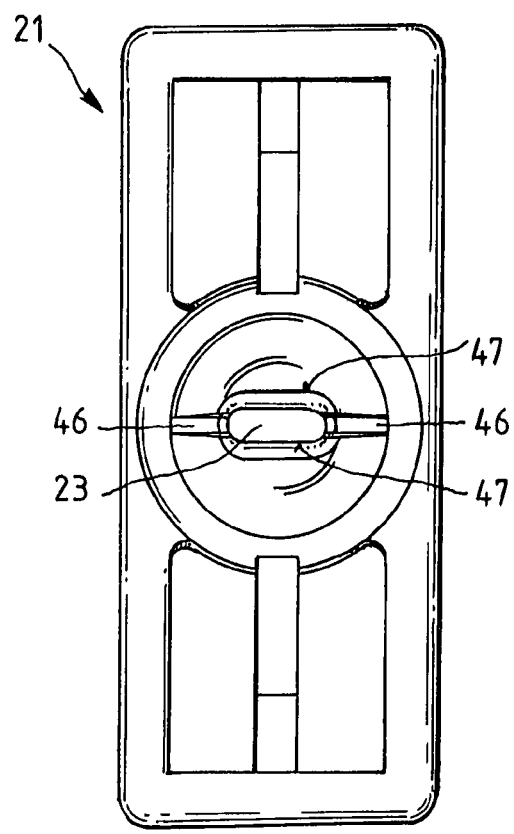
FIG. 4 is a side view of the securing body, in which the exit opening is illustrated.
Figure 5A:
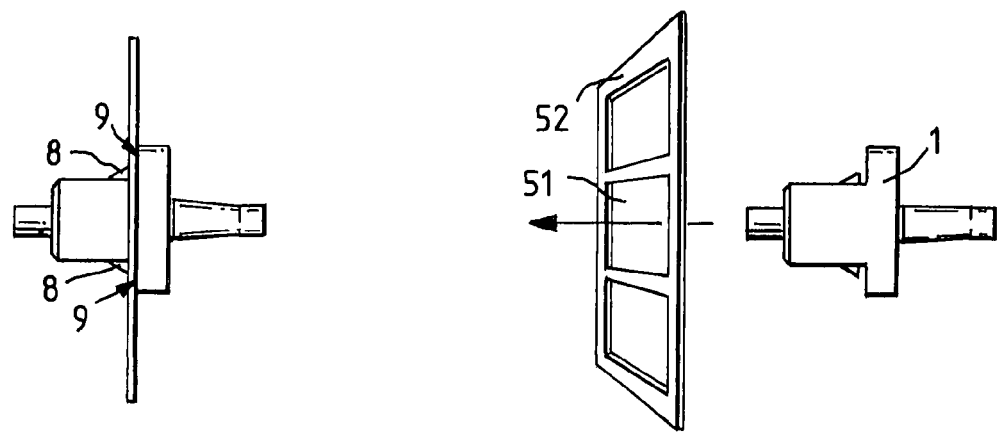

FIG. 4 illustrates a side view of the securing body. The exit opening 23 which is of oval shape can be clearly seen. The two slits 46 in the securing body ensure that clamping edges 47 which are arranged opposite one another can move apart from one another and clamp the protective hose when it is inserted, said protective hose being fitted over a glass fiber.

The securing body 21 is also produced as an injection molded part, like the main body 2. The strain relief device 40 is designed in its entirety as a two-part component.

FIGS. 5a to 5g illustrate the method for attaching a strain relief means to a glass fiber cable, at a distance from one end of a glass fiber from which its jacket has been removed. At first, the base body 1 is latched in a cutout 51 in a mounting frame 52. In the latched state, the mounting plate 52 is clamped between a main body base surface 9 and latching projections 8.

In a further method step, which is illustrated in FIG. 5b, a cable jacket 56 is cut back from an end piece 55 of a glass fiber cable 54. As a result, a glass fiber 57 and fibers 58 which are arranged in the original state between the cut-back cable jacket section and the glass fiber 57 are exposed. The fibers 58 are shortened to a predefined length with respect to their exit point from the remaining cable jacket 56. The glass fiber 57, the remaining part of the exposed fibers 58 and part of the glass fiber cable 54 are guided through a through-opening 16 in the base body 1 in a further method step which is illustrated in FIG. 5c. In the process, the glass fiber cable 54 is inserted to such an extent that an edge 59 of the cable jacket (cf. FIG. 5b) ends at the clamping body 3 approximately flush with an exit opening in the through-opening 16 through the base body 1. The fibers 58 are then combined to form a bundle and guided into the notch 5, which is formed in the clamping body 3 which is embodied in the form of a mandrel, and said fibers 58 are, if appropriate, pre-secured by a latching means. The fibers 58 are guided in such a way that they are guided tensioned in a taut fashion on an outer surface 60 of the clamping body 3 (cf. FIG. 5d).

The exposed end of the glass fiber 57 is guided through the further through-opening 33 in the securing body 21 in such a way that the facing side 24 is turned to face the main body 1. The securing body 21 is then connected to the main body 1 in such a way that the clamping body 3 of the main body 1 penetrates the further clamping body 22, embodied in the manner of a funnel, of the securing body 21. In the process, the latching elements 26, which are embodied as legs 27 (cf. FIGS. 2 and 3) penetrate the main body 1. In the process, the latching surfaces 13 come into engagement against the inner walls of the base body 1 with the further latching surfaces 28 on the legs 27 and can be latched in a plurality of stages, the distance between the surface of the clamping body 3 and the surface of the further clamping body 22 decreasing with each latching stage (cf. FIGS. 1 to 3). The multistage latching is embodied in a plurality of stages in such a way that the fibers 58 which are guided in a taut fashion on the outer surface 60 of the clamping body 3 are clamped sufficiently (cf. FIG. 5e).

Ends of the fibers 58 which project out between the base body 1 and the securing body 21 can be shortened in length with a cutting tool (cf. FIG. 5e). A protective hose 61 is then fitted over the exposed end of the glass fiber 57. Said hose 61 is then pushed (cf. FIGS. 5f and 5g) into the exit opening 23 of the securing body 21 so that the clamping edges 47 move apart from one another and clamp the protective hose 61. The protective hose 61 is inserted into the securing body 21 until the protective hose 61 abuts against the edge 59 of the cable jacket 56.

The individual method steps at the start of the method just described for attaching the strain relief device 40 can be carried out in a changed sequence. However, it is necessary for the latching of the main body 1 in the mounting plate 52 to take place before the main body 1 is connected to the securing body 21 since the connection process blocks the latching in the mounting plate 52, i.e. the latching projections 8 are blocked in terms of their spring compression into the interior of the housing 2 of the base body 1. As a result it is possible to transmit relatively large forces onto the mounting plate via the strain relief device without the latching of the main body in the mounting plate being able to become released. A strain relief device which is embodied in this way can absorb forces of 100 Newtons and more which act on the glass fiber cable 54.

Other embodiments are constructed such that the latching elements do not block the latching device with which the strain relief device is attached to the mounting plate. In these other embodiments, the strain relief device can be attached to the glass fiber cable before said cable is attached to the mounting plate. Other embodiments of this kind can also absorb forces of 100 Newtons and more. These other embodiments provide the advantage that the attachment of the strain relief device can be made more flexible with respect to the method sequence. The main body can occur before and after the connection to the securing body and the associated clamping of the exposed fibers. If appropriate, depending on the specific embodiment of the latching device, the main body or the strain relief device can be released again from the mounting plate even after it has been attached thereto.

The embodiment of a strain relief means 40 and its components (main body 1 and securing body 21) illustrated in FIGS. 1 to 4 are designed such that they can also accommodate glass fiber cables with two glass fibers. This is done essentially by making the exit opening 23 in the securing body 21 oval. For glass fiber cables which contain more glass fibers it is likewise possible to make similarly corresponding main bodies and securing bodies.

LIST OF REFERENCE NUMERALS

1 Main body
2 Housing
3 Clamping body
4 Tip
5 Notch
6 Upper side of the housing
7 Lower side of the housing
8 Latching projection
9 Main body base side surface
10 Web
11 Front side
12 Rear side
13 Latching surface
14 Teeth
15 Axis of symmetry of the clamping body
16 Through-opening
21 Securing body
22 Further clamping body
23 Exit opening
24 Facing side
25 Securing body base
26 Further latching elements
27 Legs
28 Further latching surface
30 Teeth
31 Axis of symmetry of the further clamping body
32 Guide elements
33 Further through-opening
40 Strain relief device
42 Main body base
46 Slit arrangement
47 Clamping edges
48 Common through-opening
51 Cutout
52 Mounting plate
54 Glass fiber cable
55 End piece
56 Cable jacket
57 Glass fiber
58 Fibers
59 Cable jacket edge
60 Outer surface of the clamping body
61 Protective hose

The invention claimed is:

1. A strain relief device for glass fiber cable having a cable jacket and at least one glass fiber and fibers arranged between the at least one glass fiber and the cable jacket, in which the cable jacket is cut back at an end piece of the glass fiber cable in order to provide strain relief at a distance from a termination or connection of the at least one glass fiber from which the cable jacket has been removed, said strain relief device comprising:

a main body with a clamping body; and a securing body with a further clamping body, wherein the main body and the securing body can be connected to one another so that at least some of the fibers, which are exposed when the cable jacket is cut back from the at least one glass fiber, are secured adjacent to an exit from the cable jacket between the clamping body and the further clamping body by a clamp;

wherein the main body comprises, as latching elements, at least one latching surface which is formed on an inside of a housing wall of the main body and has a plurality of teeth, and the securing body comprises, as further latching elements, at least one further latching surface which is attached on an elastic element and is embodied so as to be complementary to the latching surface and has a plurality of teeth, the elastic element penetrating the main body during a multistage latching process, and said elastic element causing the teeth of the latching surface and of the further latching surface to engage with one another; and wherein guide elements are provided which prevent the main body from rotating with respect to the securing body during the latching process and in a latched state.

2. The strain relief device as claimed in claim 1, wherein the clamping body and the further clamping body have a through-opening and a further through-opening, respectively, which, when the main body is connected to the securing body, form together a through-opening through the strain relief device through which the glass fiber cable and the at least one glass fiber extend.

3. The strain relief device as claimed in claim 1, wherein the clamping body and the further clamping body have surfaces which are complementary to one another and between which at least some of the fibers are clamped.

4. The strain relief device as claimed in claim 1, wherein the clamping body and the further clamping body comprise surfaces of conical design.

5. The strain relief device as claimed in claim 1, wherein the clamping body includes a mandrel with an outer surface which tapers conically to a tip and the further clamping body comprises a funnel-shaped inner surface which tapers conically inwards, wherein the exposed fibers are clamped between the outer and inner surfaces in a connected state.

6. The strain relief device as claimed in claim 1, further comprising a notch for guiding and pre-securing the fibers in a bundled state.

7. The strain relief device as claimed in claim 6, wherein the notch is arranged on a tip of the clamping body which is embodied as a mandrel.

8. The strain relief device as claimed in claim 1, wherein the main body has a latching device for latching the main body in a cutout in a mounting plate.

9. The strain relief device as claimed in claim 1, wherein a distance between the clamping body and the further clamping body is different in the different stages.

10. The strain relief device as claimed in claim 2, wherein the through-opening of the securing body has an oval exit opening with two clamping edges which lie opposite one another and which are configured to spring apart from one another in order to accommodate and clamp a protective hose which has been pushed over the at least one glass fiber from which the cable jacket has been removed.

11. A method for attaching aching a strain relief device on a glass fiber cable with a cable jacket, at least one glass fiber, and fibers arranged between the at least one glass fiber and the cable jacket, the cable jacket being cut back at one end of the glass fiber cable, in order to provide strain relief at a distance from a termination or connection of the at least one glass fiber from which the cable jacket has been removed, the method comprising:

arranging at least some of the fibers, which are exposed when the cable jacket is cut back from the at least one glass fiber, adjacent to an exit from the cable jacket between a clamping body of a main body of the strain relief device and a further clamping body of a securing body of the strain relief device;

connecting the main body and the securing body to one another so that at least some of the exposed fibers are secured between the clamping body and the further clamping body by a clamp;

guiding an exposed end of the at least one glass fiber through a through-opening in the securing body; and multistage latching the securing body to the main body by leading the further clamping body of the securing body via the clamping body, wherein the further clamping body tapers conically inwards, wherein the clamping body tapers conically to a tip in a mandrel-like, complementary fashion to the further clamping body, and wherein latching elements and further latching elements engage one another and reduce incrementally a distance between an outer surface of the mandrel-like clamping body and an inner surface of the further clamping body so that a clamping force on at least some of the exposed fibers increases and clamps the fibers.

12. The method as claimed in claim 11, further comprising: cutting back the cable jacket from the glass fiber and exposing at least some of the fibers.

13. The method as claimed in claim 11, further comprising: shortening the fibers so that at least some of the exposed fibers, which emerge from the cable jacket, remain prior to guiding the exposed end of the at least one glass fiber through the through-opening in the securing body.

14. The method as claimed in claim 11, further comprising: guiding the end of the at least one glass fiber from which the cable jacket has been removed and at least some of the fibers and the glass fiber cable through a through-opening in the main body so that at least some of the fibers emerge adjacent to a clamping surface of the clamping body.

15. The method as claimed in claim 11, further comprising: bundling and pre-securing at least some of the fibers by guiding them in a bundled fashion into a notch and clamping the fibers therein.

16. The method as claimed in claim 15, further comprising: placing at least some of the fibers on an external surface of the clamping body which widens conically from a tip towards a base so that the fibers are tensioned in a taut fashion at an exit from the cable jacket and the notch.

17. The method as claimed in claim 11, further comprising: fitting a protective hose over an exposed end of the at least one glass fiber and inserting the protective hose into an oval exit opening in the through-opening in the securing body until the protective hose abuts against the cable jacket, in order to accommodate and clamp the protective hose between two clamping edges which lie opposite one another and spring outwards when the protective hose is inserted.

18. The method as claimed in claim 11, further comprising: reducing in length tips of at least some of the fibers which protrude out of the strain relief device after guiding the exposed end of the at least one glass fiber through the through-opening in the securing body.

* * * * *

UNITED STATES PATENT AND TRADEMARK OFFICE
CERTIFICATE OF CORRECTION

PATENT NO.       : 7,505,666 B2
APPLICATION NO.  : 11/897363
DATED            : March 17, 2009
INVENTOR(S)      : Benedetto It is certified that error appears in the above-identified patent and that said Letters Patent is hereby corrected as shown below:

Col. 8, line 61, claim 1: "jacket and at least one glass fiber and fibers" should read --jacket, at least one glass fiber, and fibers--

Col. 8, line 62, claim 1: "jacket, in which the" should read --jacket, wherein the--

Col. 9, line 63, claim 11: "attaching aching a strain" should read --attaching a strain--

Signed and Sealed this

Sixteenth Day of March, 2010

David J. Kappos
*Director of the United States Patent and Trademark Office*